US008549176B2

(12) United States Patent
Vasseur et al.

(10) Patent No.: US 8,549,176 B2
(45) Date of Patent: Oct. 1, 2013

(54) PROPAGATION OF ROUTING INFORMATION IN RSVP-TE FOR INTER-DOMAIN TE-LSPS

(75) Inventors: Jean-Philippe Vasseur, Dunstable, MA (US); Stefano B. Previdi, Rome (IT)

(73) Assignee: Cisco Technology, Inc., San Jose, CA (US)

( * ) Notice: Subject to any disclaimer, the term of this patent is extended or adjusted under 35 U.S.C. 154(b) by 1187 days.

(21) Appl. No.: 11/001,349

(22) Filed: Dec. 1, 2004

(65) Prior Publication Data

US 2006/0117110 A1 Jun. 1, 2006

(51) Int. Cl.
*G06F 15/173* (2006.01)
*H04L 12/28* (2006.01)
*H04L 12/56* (2011.01)

(52) U.S. Cl.
USPC ........... 709/242; 709/238; 709/241; 370/389; 370/392; 370/401

(58) Field of Classification Search
USPC ................ 709/238, 241, 242, 244; 370/392, 370/401, 389
See application file for complete search history.

(56) References Cited

U.S. PATENT DOCUMENTS

| | | | |
|---|---|---|---|
| 5,088,032 A | 2/1992 | Bosack | |
| 5,995,503 A * | 11/1999 | Crawley et al. | 370/351 |
| 6,167,444 A * | 12/2000 | Boden et al. | 709/223 |
| 6,392,997 B1 | 5/2002 | Chen | |
| 6,400,681 B1 * | 6/2002 | Bertin et al. | 370/218 |
| 6,473,421 B1 | 10/2002 | Tappan | |
| 6,584,093 B1 | 6/2003 | Salama et al. | |
| 6,603,756 B1 | 8/2003 | Tappan | |
| 6,643,706 B1 | 11/2003 | Marques et al. | |
| 6,665,273 B1 | 12/2003 | Goguen et al. | |
| 6,895,441 B1 * | 5/2005 | Shabtay et al. | 709/238 |
| 6,985,960 B2 * | 1/2006 | Takashima et al. | 709/238 |
| 6,993,593 B2 * | 1/2006 | Iwata | 709/238 |
| 7,120,120 B2 * | 10/2006 | Guerin et al. | 370/238 |
| 7,215,644 B2 * | 5/2007 | Wu et al. | 370/248 |
| 7,296,087 B1 * | 11/2007 | Ashwood Smith | 709/238 |
| 7,319,700 B1 * | 1/2008 | Kompella | 370/400 |
| 7,411,955 B2 * | 8/2008 | Li et al. | 370/392 |
| 7,483,380 B2 * | 1/2009 | Metke | 370/238 |
| 7,489,695 B1 * | 2/2009 | Ayyangar | 370/396 |
| 7,558,199 B1 * | 7/2009 | Minei et al. | 370/230 |

(Continued)

OTHER PUBLICATIONS

Chandra, R. et al., RFC 1997, entitled BGP Communities Attribute, Aug. 1996, pp. 1-5.*

(Continued)

*Primary Examiner* — Abdullahi Salad
*Assistant Examiner* — Wing Ma
(74) *Attorney, Agent, or Firm* — Cesari and McKenna, LLP

(57) ABSTRACT

A technique dynamically retrieves reachability information from a target node, including a tail-end or any intermediate node, along a traffic engineering (TE) label switched path (LSP) that spans multiple domains in a computer network. The interdomain information retrieval technique is illustratively based on a request/response signaling exchange whereby at least a portion of the reachability, i.e., routing, information maintained by the target node is propagated to a head-end node of the TE-LSP. The routing information may comprise a list of address prefixes reachable by the target node, but may optionally include next-hop and metric attributes associated with those prefixes. The head-end node uses the retrieved routing information to calculate routes reachable from the target node for insertion into its routing table.

21 Claims, 8 Drawing Sheets

100

(56) References Cited

U.S. PATENT DOCUMENTS

| | | | |
|---|---|---|---|
| 7,567,512 B1* | 7/2009 | Minei et al. | 370/232 |
| 2001/0025319 A1 | 9/2001 | Takashima et al. | |
| 2001/0048660 A1* | 12/2001 | Saleh et al. | 370/216 |
| 2002/0004843 A1 | 1/2002 | Andersson et al. | |
| 2002/0093954 A1 | 7/2002 | Weil et al. | |
| 2004/0028064 A1* | 2/2004 | Cetin et al. | 370/409 |
| 2004/0081154 A1 | 4/2004 | Kouvelas | |
| 2004/0215820 A1 | 10/2004 | Blair | |
| 2005/0099954 A1* | 5/2005 | Mohan et al. | 370/241.1 |
| 2005/0111494 A1* | 5/2005 | Kecskemeti | 370/521 |
| 2006/0056328 A1* | 3/2006 | Lehane et al. | 370/315 |

OTHER PUBLICATIONS

E. Chen, et al., Address Prefix Based Outbound Route Filter for BGP-4, pp. 1-5 [online], Jun. 2003 [retrieved on Oct. 21, 2009]. Retrieved from the Internet<URL:http://www.potaroo.net/ietf/all-ids/draft-chen-bgp-prefix-orf-05.txt>.*

Vasseur, J. P., Inter-area and Inter-AS MPLS Traffic Engineering [online], Feb. 2004, whole document, [retrieved on May 8, 2010]. Retrieved from the Internet:<URL:http://tools.ietf.org/html/draft-vasseur-ccamp-inter-area-as-te-00>.*

Farrel, Adrian, A Framework for Inter-Domain MPLS Traffic Engineering [online], Aug. 2004, whole document, [retrieved on May 8, 2010]. Retrieved from the Internet<URL:http://tools.ietf.org/html/draft-ieff-ccamp-inter-domain-framework-00>.*

Le Roux, JL, Requirements for Inter-area MPLS Traffic Engineering [online], May 2004, whole document, [retrieved on May 8, 2010]. Retrieved from the Internet:<URL:http://tools.ietf.org/html/draft-ietf-tewg-interarea-mpls-te-req-01>.*

Zhang, Raymond, MPLS Inter-AS Traffic Engineering requirements [online], Nov. 2003, whole document, [retrieved on May 8, 2010]. Retrieved from the Internet:<URL:http://tools.ietf.org/html/draft-ietf-tewg-interas-mpls-te-req-02>.*

Vasseur, Jean-Philippe, Inter-AS MPLS Traffic Engineering [online], Jun. 2003, whole document, [retrieved on May 8, 2010]. Retrieved from the Internet<URL:http://tools.ietf.org/html/draft-vasseur-inter-as-te-01>.*

Ayyangar, Arthi, Inter-region MPLS Traffic Engineering [online], Jun. 2003, whole document, [retrieved on May 8, 2010]. Retrieved from the Internet:<URL:http://tools.ietf.org/html/draft-ayyangar-inter-region-te-00>.*

Vasseur, JP, RSVP Path computation request and reply messages [online], Jun. 2002, whole document, [retrieved on May 8, 2010]. Retrieved from the Internet:<URL:http://tools.ietf.org/html/draft-vasseur-mpls-computation-rsvp-03>.*

Vasseur, Jean-Philippe, Reoptimization of MPLS Traffic Engineering loosely routed explicit LSP paths [online], Jun. 2003, whole document, [retrieved on May 8, 2010]. Retrieved from the Internet:<URL:http://tools.ietf.org/html/draft-vasseur-mpls-loose-path-reopt-02>.* interface. "IEEE 100 The Authoritative Dictionary of IEEE Standards Terms Seventh Edition," IEEE Std 100-2000 , vol., No., 2000 [online]. Retrieved on Sep. 8, 2010. Retrieved from the Internet: <URL: http://ieeexplore.ieee.org/servlet/opac?punumber=4116785>.* logic. Microsoft® Computer Dictionary, Fifth Edition [online]. Microsoft Press, May 1, 2002. Retrieved on Feb. 7, 2011. Retrieved from the Internet: <URL:http://proquest.safaribooksonline.com/0735614954>.*

Abarbanel, Ben, BGP-4 support for Traffic Engineering [online], Sep. 2000, whole document, [retrieved on Feb. 7, 2011]. Retrieved from the Internet<URL:http://tools.ietf.org/html/draft-abarbanel-idr-bgp4-te-01>.*

Semeria, Chuck, RSVP Signaling Extensions for MPLS Traffic Engineering [online], Juniper Networks, Inc., Sep. 2000, p. 1-29, [retrieved on Feb. 7, 2011]. Retrieved from the Internet:<URL:http://www.terabitsystems.com/juniper-docs/RSVP%20Signaling%20Extensions%20for%20MPLS%20-Traffic%20Engineering.pdf>.*

Katz, D., IP Router Alert Option [online], RFC 2113, Feb. 1997, whole document, [retrieved on Feb. 7, 2011]. Retrieved from the Internet:<URL:http://tools.ietf.org/html/rfc2113>.*

Shen, N., Calculating Interior Gateway Protocol (IGP) Routes Over Traffic Engineering Tunnel, RFC 3906, [online], Oct. 2004, whole document, [retrieved on Jul. 2, 2011]. Retrieved from the Internet<URL:http://tools.ietf.org/pdf/rfc3906.pdf>.*

Awduche, D., Applicability Statement for Extensions to RSVP for LSP-Tunnels, RFC 3210, [online], Dec. 2001, whole document, [retrieved on Jul. 2, 2011]. Retrieved from the Internet:<URL:http://tools.ietf.org/html/rfc3210>.*

Thomas II, T. M. "Chapter 7. Interface Configuration." in: Juniper Networks Reference Guide, JUNOS Routing, Configuration, and Architecture (Boston, Addison-Wesley Professional, 2002), p. 203-251.*

Prelsser, C. et al., RSVP-TE extensions for interdomain LSPs, [online], Oct. 2002, whole document, [retrieved on May 17, 2013]. Retrieved from the Internet:<URL:http://totem.info.ucl.ac.be/publications/papers-elec-versions/draft-pelsser-rsvp-te-interdomain-lsp-00.pdf>.*

Rekhter, Y., RFC 1771, entitled a Border Gateway Protocol 4 (BGP-4), Mar. 1995, pp. 1-54.

Vasseur et al., U.S. Appl. No. 10/767,574, filed Sep. 18, 2003 entitled Computing Inter-Autonomous System MPLS Traffic Engineering LSP Paths.

Vasseur et al., U.S. Patent Application Serial No., filed Dec. 1, 2004, entitled Inter-Domain TE-LSPS With IGP Extensions.

Farrel, A. et al., Network Working Group Internet Draft, entitled Encoding of Attributes for Multiprotocol label Switching (MPLS) Label Switched Path (LSP) Establishment Using RSVP-TE (draft-ietf-mpls-rsvpte-attributes-04.txt), Jul. 2004, pp. 1-18.

Callon, R., RFC 1195, entitled Use of OSI ISIS for routing in TCP/IP and Dual Environments, Dec. 1990, pp. 1-80.

Rekhter, Y., RFC 1771, entitled A Border Gateway Protocol 4 (BGP-4), Mar. 1995, pp. 1-28.

Braden, R. et al., RFC 2205, entitled Resource ReSerVation Protocol (RSVP), Version 1 Functional Specification, Sep. 1997, pp. 1-112.

Moy, J., RFC 2328, entitled OSPF Version 2, Apr. 1998, pp. 1-183.

Awduche, D. et al., RFC 3209, entitled RSVP-TE: Extensions to RSVP for LSP Tunnels Dec. 2001, pp. 1-43.

Katz, D. et al., RFC 3630, entitled Traffic Engineering (TE) Extensions to OSPF Version 2, Sep. 2003, pp. 1-14.

Smit, H., RFC 3784, entitled Intermediate-System-to-Intermediate-System (IS-IS) Extensions for Traffic Engineering (TE), Jun. 2004, pp. 1-13.

Mannie, E., RFC 3945, entitled Generalized Multi-Protocol Label Switching (GMPLS) Architecture, Oct. 2004, pp. 1-65.

Mannie, E., RFC 3946, entitled Generalized Multi-Protocol Label Switching (GMPLS) Extensions for Synchronous Optical Network (SONET) and Synchronous Digital Hierarchy (SDH) Control, Oct. 2004, pp. 1-25.

International Application No. PCT/US05/41796, International Filing Date Nov. 17, 2005, Notification of Transmittal of the International Search Report and the Written Opinion of the International Searching Authority, or the Declaration, Mailed Oct. 24, 2006, 7 pgs.

Coltun, R., Sierra Systems, D. Ferguson, Juniper Networks, and J. Moy, Sycamore Networks, "OSPF for IPv6; rfc2740.txt," IETF Standard, Internet Engineering Task Force, IETF, CH, XP015008523,. Dec. 1999, pp. 1-81.

Awduche, D., Movaz Networks, Inc. et al., "RSVP-TE: Extension to RSVP for LSP Tunnels; rfc3209.txt," IETF Standard, Internet Engineering Task Force, IETF, CH, XP015008988, Dec. 2001, pp. 1-62.

Plesser, Cristel et al., "Extending RSVP-TE to Support Inter-AS LSPs," High Performance Switching and Routing, 2003, HPSR. Workshop on Jun. 24-27, 2003, Piscataway, NJ, USA, IEEE, Jun. 24, 2003, pp. 79-84.

Supplementary European Search Report, European Application No. 05849074.9-1249 / 1836599, PCT/US2005041796, Applicant: Cisco Technology, Inc., Jul. 31, 2008, pp. 1-10.

\* cited by examiner

PROPAGATION OF ROUTING INFORMATION IN RSVP-TE FOR INTER-DOMAIN TE-LSPS

RELATED APPLICATION

This application is related to U.S. application Ser. No. 11/001,459, entitled INTER-DOMAIN TE-LSP WITH IGP EXTENSIONS, filed by Vasseur et al, on even date herewith.

BACKGROUND OF THE INVENTION

1. Field of the Invention

The present invention relates to computer networks and more particularly to retrieving reachability information across domains of a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. Moreover, it may be desirable to interconnect various ASes that are operated under different administrative domains. As used herein, an AS or, more particularly, an area is generally referred to as a "domain," and a router that interconnects different domains together is generally referred to as a "border router."

An example of an interdomain routing protocol is the Border Gateway Protocol version 4 (BGP), which performs routing between domains (ASes) by exchanging routing and reachability information among neighboring interdomain routers of the systems. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. The BGP protocol is well known and generally described in Request for Comments (RFC) 1771, entitled *A Border Gateway Protocol 4 (BGP-4)*, published March 1995.

Examples of an intradomain routing protocol, or an interior gateway protocol (IGP), are the Open Shortest Path First (OSPF) routing protocol and the Intermediate-System-to-Intermediate-System (ISIS) routing protocol. The OSPF and ISIS protocols are based on link-state technology and, therefore, are commonly referred to as link-state routing protocols. Link-state protocols define the manner with which routing information and network-topology information are exchanged and processed in a domain. This information is generally directed to an intradomain router's local state (e.g., the router's usable interfaces and reachable neighbors or adjacencies). The OSPF protocol is described in RFC 2328, entitled OSPF Version 2, dated April 1998 and the ISIS protocol used in the context of IP is described in RFC 1195, entitled *Use of OSI ISIS for routing in TCP/IP and Dual Environments*, dated December 1990, both of which are hereby incorporated by reference.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets.

When a packet is received at the intermediate network node, the packet's destination address may be used to identify a routing table entry containing routing information associated with the received packet. Among other things, the packet's routing information indicates the packet's next-hop address.

Multi-Protocol Label Switching (MPLS) Traffic Engineering has been developed to meet data networking requirements such as guaranteed available bandwidth or fast restoration. MPLS Traffic Engineering exploits modern label switching techniques to build guaranteed bandwidth end-to-end tunnels through an IP/MPLS network of label switched routers (LSRs). These tunnels are a type of label switched path (LSP) and thus are generally referred to as MPLS Traffic Engineering (TE) LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version 2* dated September 2003, the contents of all of which are hereby incorporated by reference in their entirety.

Establishment of an MPLS TE-LSP from a head-end LSR to a tail-end LSR involves computation of a path through a network of LSRs. Optimally, the computed path is the "shortest" path, as measured in some metric, that satisfies all relevant LSP Traffic Engineering constraints such as e.g., required bandwidth, availability of backup bypass tunnels for each link and node included in the path, etc. Path computation can either be performed by the head-end LSR or by some other entity operating as a path computation element (PCE). The head-end LSR (or a PCE) exploits its knowledge of network topology and resources available on each link to perform the path computation according to the LSP Traffic Engineering constraints. Various path computation methodologies are available including CSPF (constrained shortest path first). MPLS TE-LSPs can be configured within a single domain, e.g., IGP area or level, or may also span multiple domains, e.g., IGP areas or levels.

One difficulty that arises in crossing domain boundaries is that path computation at the head-end LSR requires knowledge of network topology and resources across the entire network between the head-end and the tail-end LSRs. Yet service providers typically do not share this information with each other across domain borders. In particular, network topology and resource information do not generally flow across area boundaries even though a single service provider may operate all the areas or levels. Neither the head-end LSR nor any single PCE will have sufficient knowledge to compute a path. Because of this, MPLS Traffic Engineering path computation techniques are required to compute inter-domain TE-LSPs.

The use of PCEs has been adapted to create a distributed PCE architecture, in order to extend MPLS TE-LSPs across domain boundaries. An example of such a distributed architecture is described in commonly-owned copending U.S. patent application Ser. No. 10/767,574, entitled COMPUTING INTER-AUTONOMOUS SYSTEM MPLS TRAFFIC ENGINEERING LSP PATHS, filed by Vasseur et al., on Sep. 18, 2003, the contents of which are hereby incorporated by reference in its entirety. In a distributed PCE architecture, the visibility needed to compute paths is extended between adjacent domains so that PCEs may cooperate to compute paths across multiple domains by exchanging virtual shortest path trees (VSPTs) while preserving confidentiality across domains (e.g., when applicable to ASes).

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205. In the case of traffic engineering applications, RSVP signaling is used to establish a TE-LSP and to convey various TE-LSP attributes to routers, such as border routers, along the TE-LSP obeying the set of required constraints whose path may have been computed by various means.

Occasionally, a head-end LSR or node will have multiple TE-LSPs into a particular domain (e.g., area or level) outside of its own domain (i.e., remote). These interdomain TE-LSPs may terminate at either a single tail-end LSR or node of the remote domain, or at different tail-end nodes within the same remote domain, depending upon their initial setup. A known limitation of such inter-domain TE-LSPs lies in the inability to automatically steer traffic onto such TE-LSPs when attempting to reach nodes or prefixes contained within the domain of the tail-end node. This limitation is primarily due to limited network topology information available to the head-end node. Currently, this lack of reachability information has required the use of static or policy-based routing, which generally requires manual configuration by a system administrator with prior knowledge of the network topology. Such alternatives can be cumbersome and limited in their applicability, and in some cases (e.g., misconfiguration) can be the cause of network failure.

SUMMARY OF THE INVENTION

The present invention is directed to a technique for dynamically retrieving reachability information from a target node, including a tail-end or any intermediate node, along a traffic engineering (TE) label switched path (LSP) that spans multiple domains in a computer network. The inter-domain information retrieval technique is illustratively based on a request/response signaling exchange whereby at least a portion of the reachability, i.e., routing, information maintained by the target node is propagated to a head-end node of the TE-LSP. The routing information may comprise a list of address prefixes reachable by the target node, but may optionally include next-hop and metric attributes associated with those prefixes.

In the illustrative embodiment described herein, the request/response signaling exchange is embodied as extensions to Resource ReSerVation Protocol (RSVP) TE signaling messages. Notably, the RSVP extensions are, in turn, embodied as new RSVP objects, flags, and/or type/length/value (TLV) encoded formats contained within the RSVP objects. Moreover, the signaling exchange is implemented in accordance with either a "pull" or "push" mode. In pull mode, the head-end node may request either complete or partial routing information from one or more target nodes. In push mode, the head-end node initially requests complete or partial routing information retrieval from the target node, as in pull mode. However, in push mode the target node is further configured to subsequently provide unsolicited updates to the head-end node, where the updates comprise changes to the requested routing information.

Specifically, a request stage of the signaling exchange enables the head-end node to request the routing information from the target node. Here, a new Routing Information Request (RI-REQ) object is included within an RSVP object issued by the head-end node. The RI-REQ object is illustratively embodied as a TLV contained in a RSVP path message and may contain a series of configured flags relating to the requested reachability information. The RI-REQ TLV may also contain a list of the target node or nodes along the TE-LSP from which the reachability information is requested. In addition, a novel access control list (ACL) sub-TLV may be included within the RI-REQ TLV that limits the amount of reachability information to be returned. The ACL sub-TLV allows the head-end node to request partial routing information, wherein the partial information request is manifested by policy attributes defining a subset of the routing information.

In a response stage of the exchange, the target node receives the RI-REQ TLV and returns an RSVP reserve message containing a novel RI-ENTRY object. The RI-ENTRY object is illustratively embodied as a TLV adapted to hold one or more novel sub-TLVs containing at least a portion of the node's routing information. These novel sub-TLVs include (i) an RI-PREFIX sub-TLV containing a reachable address prefix, (ii) an RI-PREFIX-COST sub-TLV containing a cost metric associated with reaching the prefix from the target node, and (iii) an RI-PREFIX-NH (next hop) sub-TLV containing a next hop address for reaching the prefix. Each reachable address prefix may be contained within a separate RI-ENTRY TLV.

Upon receiving the RI-ENTRY TLV, the head-end node extracts the retrieved routing information and uses that information to calculate routes reachable from the target node for insertion into its routing table. To that end, the head-end node maintains a "shadow table" that contains at least the routing information obtained from the RI-ENTRY TLV returned by each target node. When calculating routes, i.e., address prefixes and associated attributes, the head-end node "merges" the contents of the shadow table with the routes stored in the routing table to thereby reflect the address prefixes and associated attributes reachable by the target node. Notably, the attributes associated with these calculated (merged) routes include (i) a next-hop interface (e.g., the TE-LSP), (ii) a next-hop address of the target node, and (iii) a cost metric for the computed routes.

Advantageously, the novel technique dynamically retrieves inter-domain reachability information from any node along an established TE-LSP at a head-end node of the TE-LSP. By dynamically informing the head-end node of the reachability information of nodes along the TE-LSP that spans multiple domains, the inventive technique provides an alternative to sub-optimal routing techniques, such as cumbersome manual configuration (e.g., static routing or policy routing), that can avoid some of the risks and possible errors created in such sub-optimal routing techniques.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
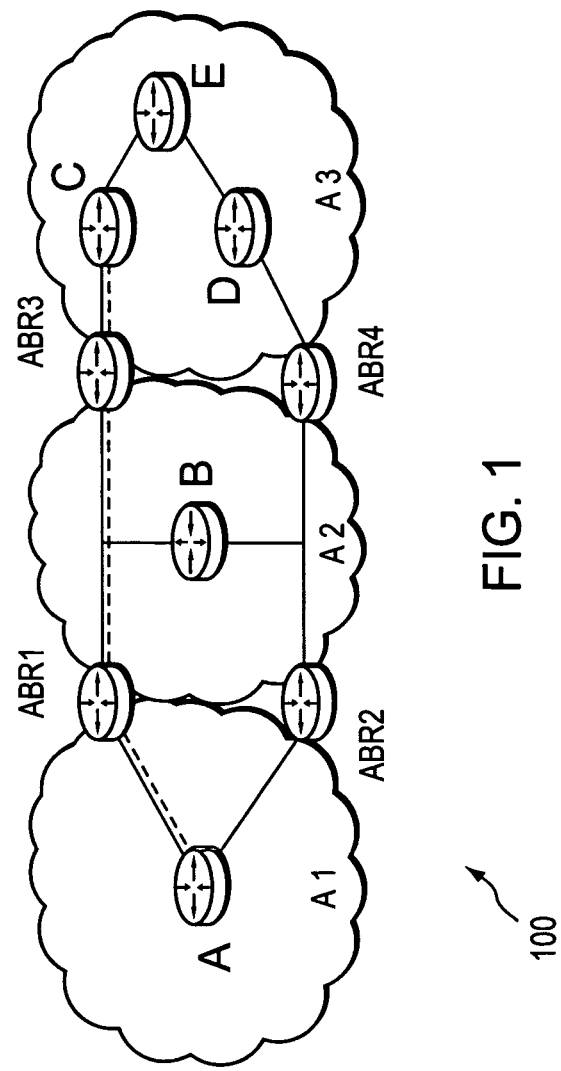
FIG. 1 is a schematic block diagram of an exemplary computer network of areas that may be used in accordance with the present invention.

FIG. 1 is a schematic block diagram of an exemplary computer network 100 comprising areas A1 and A2 having exemplary intradomain routers A and B, respectively, and area A3, which has exemplary intradomain routers C, D, and E. In addition, A1 and A2 share area border routers ABR1 and ABR2, while A2 and A3 share ABR3 and ABR4. As used herein, an area is a collection of routers that share full network topology information with each other but not necessarily with routers outside the area. A collection of areas may be contained within a single autonomous system (AS). The term area as used herein also encompasses the term "level" which has a similar meaning for networks that employ IS-IS as their interior gateway protocol (IGP), in which case the area border routers ABR1-4 are embodied as level 1/level 2 (L1L2) routers. These examples are merely representative. The terms area and level are used interchangeably herein, as well as the use of ABR, L1L2 routers, and more generally, border routers.

Data packets may be exchanged among the areas A1-A3 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers of the areas using predetermined IGPs, such as conventional distance-vector protocols or, illustratively, link-state protocols, through the use of link-state advertisements or link-state packets.

Figure 2:
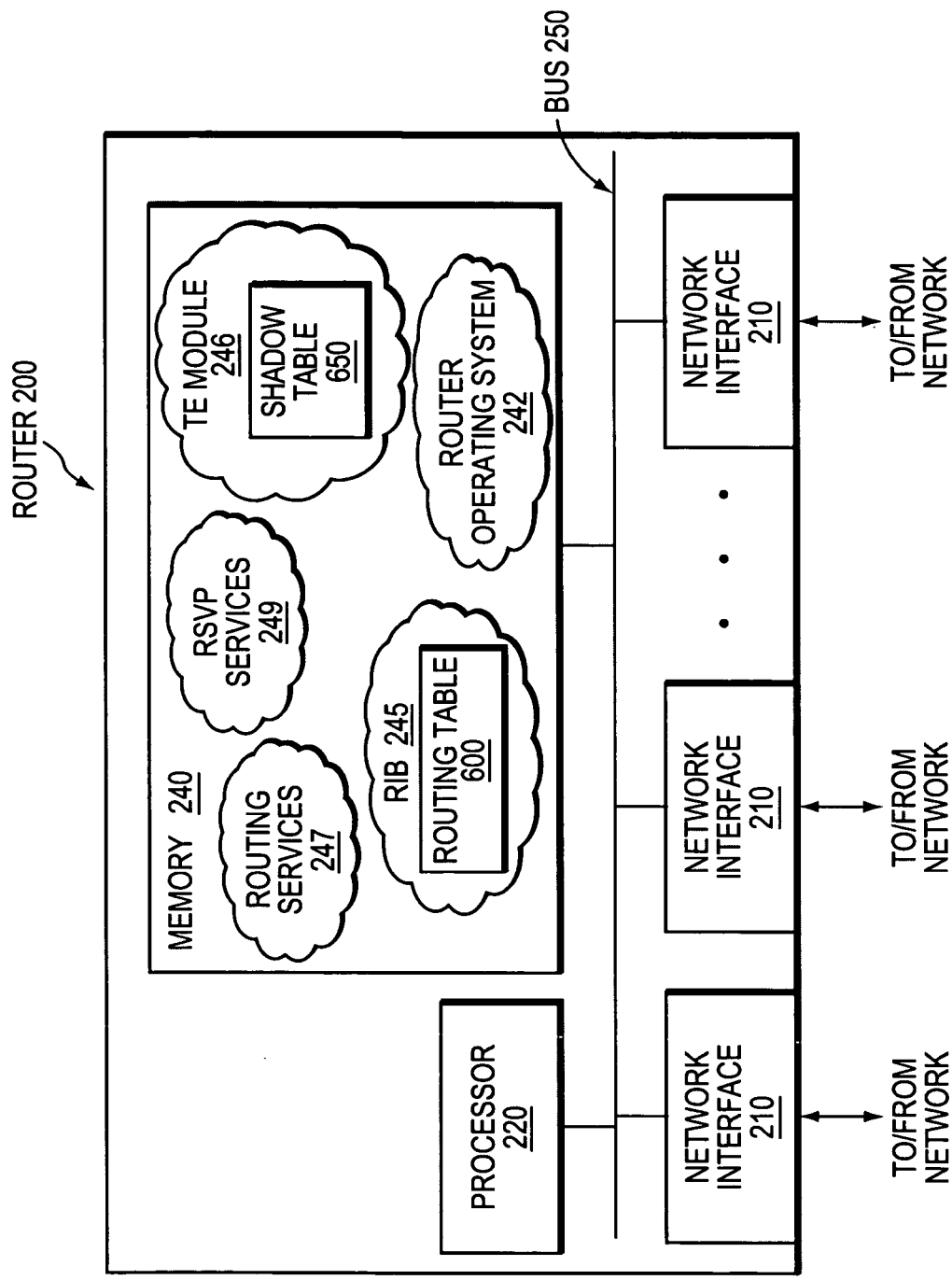
FIG. 2 is schematic block diagram of an exemplary router that may be advantageously used with the present invention.

FIG. 2 is a schematic block diagram of an exemplary router 200 that may be advantageously used with the present invention as an intradomain router or a border router. The router comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as routing table 600 and shadow table 650. A router operating system 242, portions of which are typically resident in memory 240 and executed by the processor, functionally organizes the router by, inter alia, invoking network operations in support of software processes and/or services executing on the router. These software processes and/or services include Routing Information Base (RIB) 245, Traffic Engineering (TE) module 246, routing services 247, and RSVP services 249. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as OSPF and IS-IS. These functions may be configured to manage a forwarding information database (not shown) containing, e.g., data used to make forwarding decisions. RSVP services 249 contain computer executable instructions for implementing RSVP and processing RSVP messages in accordance with the present invention. RSVP is described in R. Braden, et al., *Resource ReSerVation Protocol* (RSVP), Request For Comments (RFC) 2205, September 1997, available from the IETF and which is hereby incorporated by reference as though fully set forth herein, and in RFC 3209, entitled *RSVP-TE: Extensions to RSVP for LSP Tunnels*, as incorporated above.

In one embodiment, the routers described herein are IP routers that implement Multi-Protocol Label Switching (MPLS) and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress (or one hop prior), a forwarding decision is made based on the incoming label but optionally no label is included when the packet is sent on to the next hop. The paths taken by packets that traverse the network in this manner are referred to as label switched paths (LSPs). An example TE-LSP is shown as a dotted line between a head-end node (A) and a tail-end node (C) in FIG. 1. Establishment of a TE-LSP requires computation of a path, signaling along the path, and modification of forwarding tables along the path. MPLS TE establishes LSPs that have guaranteed bandwidth under certain conditions. Illustratively, the TE-LSPs may be signaled through the use of the RSVP protocol and, in particular, RSVP TE signaling messages.

Figure 3A:
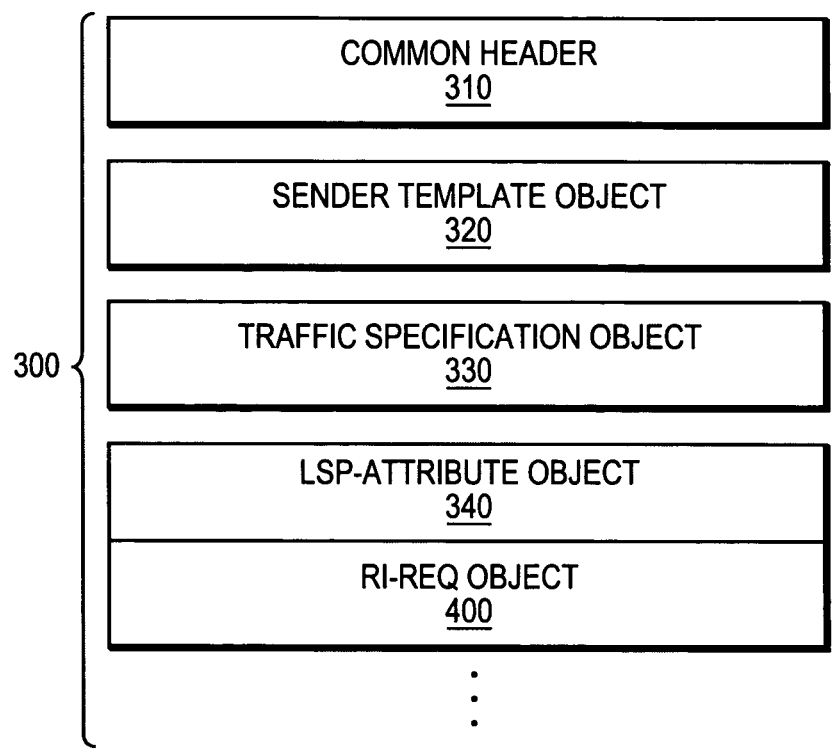
FIG. 3A is a schematic block diagram of portions of an RSVP Path message that may be advantageously used with the present invention.

In accordance with RSVP, to establish a data flow between a sender (e.g., head-end node A) and a receiver (e.g., tail-end node C), the sender may send an RSVP path (Path) message downstream hop-by-hop along a path (e.g., a unicast route) to the receiver to identify the sender and indicate e.g., bandwidth needed to accommodate the data flow, along with other attributes of the TE-LSP. The Path message may contain various information about the data flow including, e.g., traffic characteristics of the data flow. FIG. 3A is a schematic block diagram of portions of an RSVP Path message 300 that may be advantageously used with the present invention. Message 300 contains, inter alia, a common header 310, a sender template object 320, a traffic specification (Tspec) object 330 and an LSP-Attribute object 340. It should be noted that message 300 may contain other objects including a novel Routing Information Request (RI-REQ) object 400 (described further below).

Figure 3B:
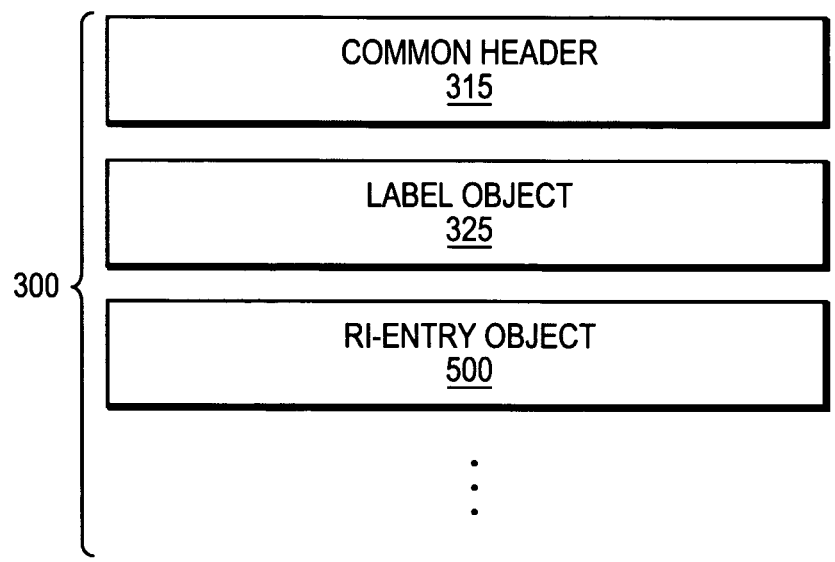
FIG. 3B is a schematic block diagram of portions of an RSVP Resv message that may be advantageously used with the present invention.

To establish a TE-LSP (data flow) between a receiver and a sender, the receiver may return an RSVP Reserve (Resv) message upstream along the path to the sender to confirm the attributes of the TE-LSP, and provide a TE-LSP label. FIG. 3B is a schematic block diagram of portions of an RSVP Resv message 305 that may be advantageously used with the present invention. Message 305 contains, inter alia, a common header 315 and a label object 325. It should be noted that message 305 may contain other objects including a novel Routing Information Entry (RI-ENTRY) object 500 (described further below). It should be further noted that in accordance with RSVP signaling, the state of the RSVP is refreshed on a timed interval, e.g., every thirty seconds, in which RSVP Path and Resv messages are exchanged. This timed interval is configurable by a system administrator.

Although the illustrative embodiment described herein is directed to MPLS, it should also be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled *Generalized Multi-Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

To compute paths across multiple domains, previously incorporated U.S. Application Ser. No. 10/767,574 describes the use of a virtual shortest path tree (VSPT) algorithm in a distributed path computation element (PCE) architecture. Notably, it will be apparent to those skilled in the art that other methods may be used to compute the TELSPs (e.g., loose hops, explicit paths, etc.), and such methods are within the scope of the present invention. Furthermore, the path computation request (and response) can be implemented in accordance with a protocol specified in Vasseur, et al. *RSVP Path Computation Request and Reply Messages*, Internet Draft, July 2004, which is hereby incorporated by reference as though fully set forth herein.

The present invention is directed to a technique for dynamically retrieving reachability information from a target node, including a tail-end or any intermediate node, along a TE-LSP that spans multiple domains in a computer network. The inter-domain information retrieval technique is illustratively based on a request/response signaling exchange whereby at least a portion of the reachability, i.e., routing, information maintained by the target node is propagated to a head-end node of the TE-LSP. The routing information may comprise a list of address prefixes reachable by the target node, but may optionally include next-hop and metric attributes associated with those prefixes.

In the illustrative embodiment described herein, the TE-LSP is computed and established using RSVP TE signaling messages in accordance with known explicit path (user configurable) and/or PCE technologies. In particular, RSVP services 249 employs such signaling and techniques to compute one or more metrics (e.g., costs) associated with the established TE-LSP. A reference (label) to the TE-LSP, as well as the computed metric, are then stored in shadow table 650, as described herein. In addition, the request/response signaling exchange is embodied as extensions to the RSVP TE signaling messages described herein. Notably, the RSVP extensions are, in turn, embodied as new RSVP objects, flags, and/or type/length/value (TLV) encoded formats contained within the RSVP objects. TLV encoding is used to identify a type (T) of information being communicated (conveyed), a length (L) of information to be conveyed, and a value (V) of the actual information conveyed. The length (L) parameter contained in a length field of, e.g., a TLV object, is typically implementation-specific and can denote the length from the beginning of the Type field of the object to the end. However, the length generally denotes the length of a Value (V) field and not the Type (T) or Length (L) fields.

A request stage of the signaling exchange enables the head-end node, e.g., head-end node A, to request the routing information from the target node, e.g., tail-end node C. Here, a new Routing Information Request (RI-REQ) TLV is included within an RSVP object issued by the head-end node. The RI-REQ TLV is illustratively contained in a RSVP path message 300 and may contain a series of configured flags relating to the requested reachability information. The RI-REQ TLV may also contain a list of the target node or nodes along the TE-LSP from which the reachability information is requested.

Figure 4:
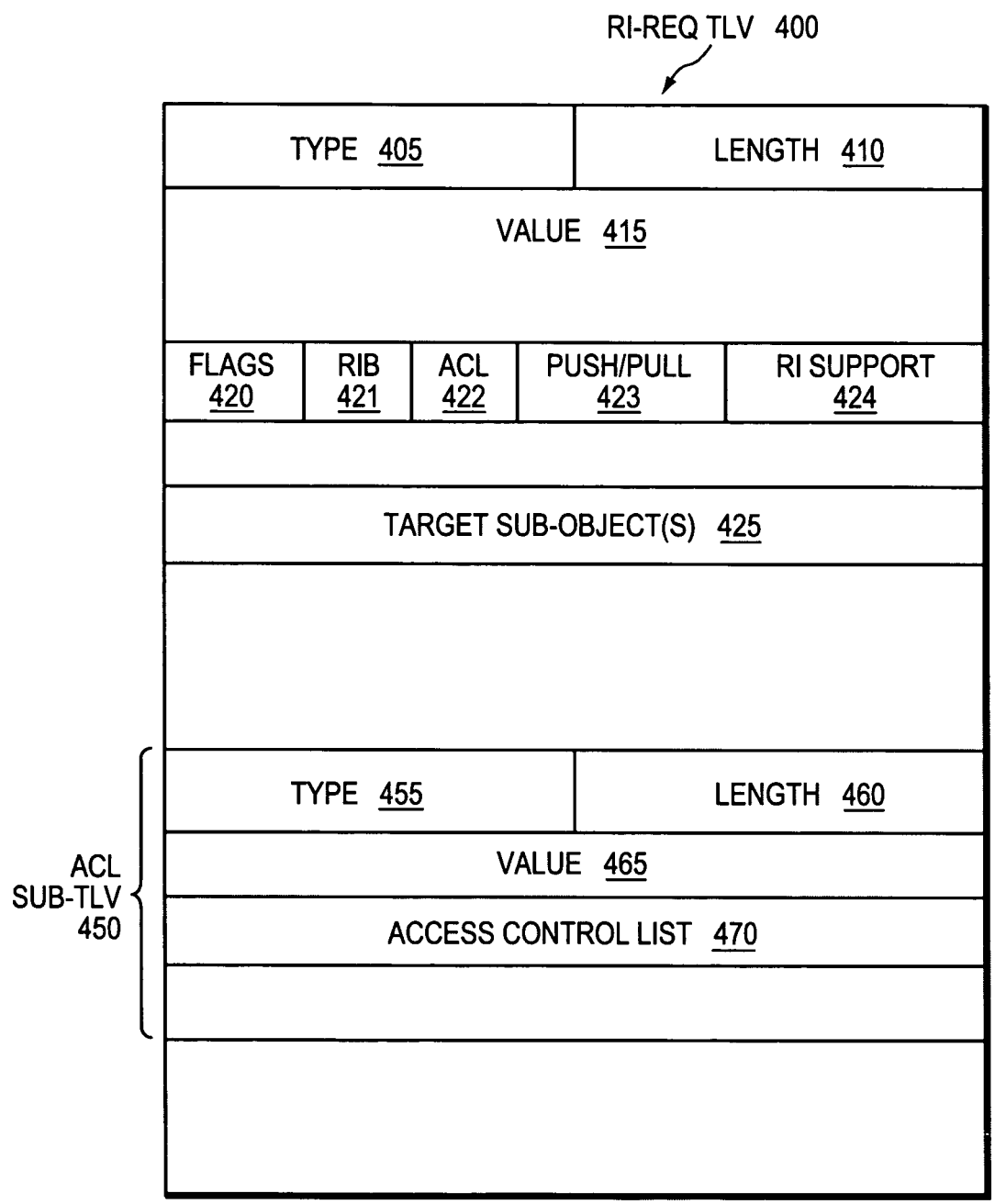
FIG. 4 is a schematic block diagram illustrating the format of a RI-REQ TLV that may be advantageously used with the present invention.

FIG. 4 is a schematic block diagram illustrating the format of a RI-REQ TLV 400 that may be advantageously used with the present invention. The RI-REQ TLV 400 comprises a Type field 405 containing a predetermined RI-REQ TLV type value and a length field 410 containing a variable length value. A Value field 415 illustratively contains a flag field 420 adapted to store a number of flags, such as a RIB flag 421, an access control list (ACL) flag 422, a pull/push flag 423, and an RI-Supported flag 424, described in further detail below. The Value field 415 also contains at least one target sub-object 425 used to specify to which target node along the TE-LSP the RI-REQ TLV is directed. The target sub-object 425 is illustratively an IPv4 sub-object, described in RFC 3209 above. In the event the head-end node requests routing information from multiple nodes along the TE-LSP, multiple target sub-objects 425 may be used, e.g., one for each target node.

As noted, the RI-REQ TLV 400 is contained within an RSVP object, which, illustratively, is an LSP-Attributes object. The LSP-Attributes object is described in detail in Farrel, et al. *Encoding of Attributes for Multiprotocol Label Switching (MPLS) Label Switched Path (LSP) Establishment Using RSVP-TE*, Internet Draft, July 2004, which is hereby incorporated by reference as though fully set forth herein. The object class of the RI-REQ TLV 400 is preferably in the form of "11bbbbbb," and, as those skilled in the art will understand, is transparently propagated by any intermediate node not supporting the RI-REQ TLV.

The Value field 415 of the RI-REQ TLV 400 may further contain a novel ACL sub-TLV 450 that limits the amount of reachability information to be returned by the target node. The ACL sub-TLV 400 allows the head-end node to request partial routing information, wherein the partial information request is manifested by policy attributes defining a subset of the routing information. Illustratively, the ACL sub-TLV 450 includes a Type field 455, a Length field 460, and a Value field 465 containing an access control list 470 of address prefixes used to limit the amount of reachability information requested from the target node. For example, a head-end node may limit the request to a predetermined set of loopback addresses, subnets, masks, prefixes, etc., associated with, e.g., particular MPLS VPNs (virtual private networks), Points-of-Presence (PoPs), or voice over IP (VoIP) gateways. Notably, the presence of the ACL sub-TLV 450 in the RI-REQ TLV 400 is indicated by the assertion of ACL flag 422. In the event that the ACL sub-TLV is not present (e.g., the ACL flag is not asserted), the RI-REQ TLV requests complete reachability information from the target node(s).

According to an aspect of the invention, the signaling exchange is implemented in accordance with either a "pull" or "push" mode, as illustratively manifested by assertion of the push/pull flag 423. Alternatively, the head-end and/or target nodes may be configured manually to operate in either pull or push mode. In pull mode, the head-end node may request either complete or partial routing information from one or more target nodes. Notably, the head-end node receives the routing information from the target nodes only when requested. For example, the head-end node may retrieve routing information from the target node(s), as requested, by asserting the push/pull flag 423 (e.g., to a pull state) and the RIB flag 421. Once the requested routing information is received, as described herein, the head-end node may de-assert the RIB flag until a later time when it wishes to update the routing information. At that time, the head-end node simply re-asserts the RIB flag 421 to receive the requested routing information in its entirety again. The assertion and de-assertion of the RIB flag may be in accordance with a predetermined time schedule, or manually configured at the head-end node.

In push mode, the head-node initially requests complete or partial routing information retrieval from the target node, as described above in pull mode. However, in push mode, the target node is further configured to subsequently provide unsolicited updates to the head-end node, where the updates comprise changes to the requested routing information. Such changes to the routing information may include situations where a link is added or removed (e.g., link failure) from a shortest path tree (SPT) of the target. Illustratively, when receiving a RI-REQ TLV 400 containing a de-asserted push/pull flag 423 (e.g., to a push state), the target node tags each prefix entry in its routing table (e.g., with a flag) indicating that should the entry be overwritten (updated), the update must be sent to the head-end node. The target node then sends the update to the head-end node. Alternatively, the target nodes may be configured to return all routing information, and not just changes/updates. These updates continue until the flag 423 is asserted to the pull state, or until the TE-LSP is destroyed (i.e., by an RSVP "path_tear" message).

It will be understood by those skilled in the art that each push/pull mode will have various advantages for certain network architectures. For example, pull mode advantageously limits traffic (routing information) transmitted through the network, especially, e.g., where the availability of a link in the network is continually changing between being available and unavailable ("flapping"), and such flapping increases the frequency of routing information updates. Push mode, however, advantageously provides the head-end node with the most up-to-date routing information in the network.

In a response stage of the signaling exchange, the target node receives the RI-REQ TLV 400 and returns an RSVP reserve message 305 containing a novel RI-ENTRY object. The RI-ENTRY object is illustratively embodied as a TLV adapted to hold one or more novel sub-TLVs containing at least a portion of the node's routing information. These novel sub-TLVs include (i) an RI-PREFIX sub-TLV containing a reachable address prefix, (ii) an RI-PREFIX-COST sub-TLV containing a cost metric associated with reaching the prefix from the target node, and (iii) an RI-PREFIX-NH (next hop) sub-TLV containing a next hop address for reaching the prefix. Each reachable address prefix may be contained within a separate RI-ENTRY TLV.

Figure 5:
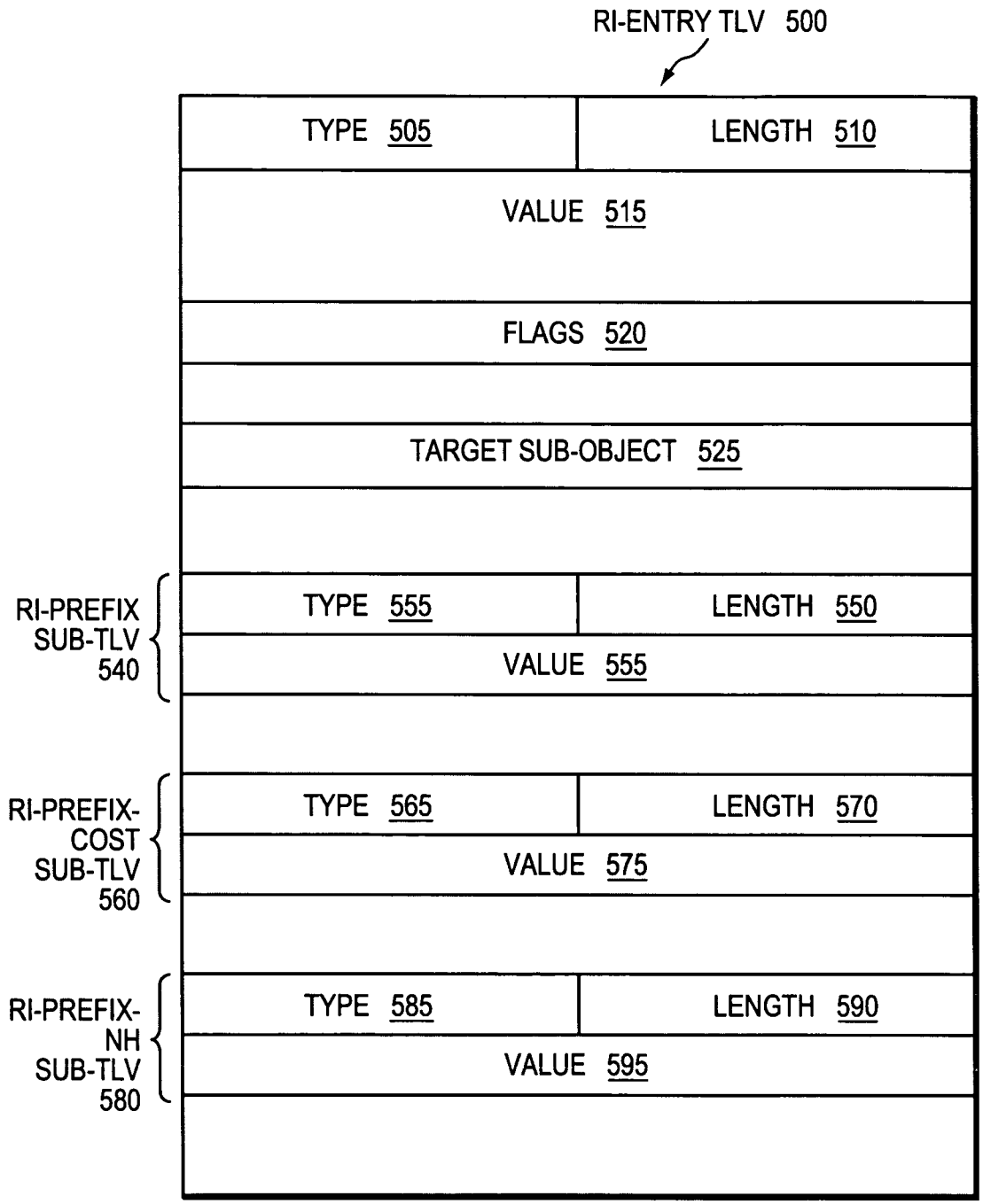
FIG. 5 is a schematic block diagram illustrating the format of a RI-ENTRY TLV that may be advantageously used with the present invention.

FIG. 5 is a schematic block diagram illustrating the format of a RI-ENTRY TLV 500 that may be advantageously used with the present invention. The RI-ENTRY TLV 500 comprises a Type field 505 containing a predetermined RI-ENTRY TLV type value, and a Length field 510 containing a variable length value. A Value field 515 illustratively contains a flags field 520 adapted to store a number of flags denoting the same features as the flags of flags field 420. The Value field 515 also contains a target sub-object 525 used to specify from which target node along the TE-LSP the RI-ENTRY TLV is sent. The target sub-object 525 is illustratively an IPv4 sub-object. In the event the head-end node requests routing information from multiple nodes along the TE-LSP, each target node sends its own RI-ENTRY TLV 500.

In addition, the Value field 515 contains an RI-PREFIX sub-TLV 540 comprising Type (545), Length (550), and Value (555) fields. Type field 545 contains a predetermined RI-ENTRY sub-TLV value, and Length field 550 contains a variable length value. The Value field 555 contains an address prefix that is reachable by the target node. As noted, each reachable prefix is preferably contained within a distinct RI-ENTRY TLV; however, other embodiments may be used within the scope of the present invention, including the use of multiple RI-PREFIX sub-TLVs 540 within a single RI-ENTRY TLV 500. Also, in the event the number of reachable prefixes is too large for containment within a single RI-ENTRY TLV, multiple RI-ENTRY TLVs may be used.

Moreover, Value field 515 may additionally contain an RI-PREFIX-COST sub-TLV 560, and/or an RI-PREFIX-NH (next-hop) sub-TLV 580. Each of these sub-TLVs has a Type field (565, 585) containing a respective predetermined sub-TLV type value, and a Length field (570, 590) containing a variable length value. The Value field 575 of the RI-PREFIX-COST sub-TLV 560 contains a metric value calculated by the target node to reach the prefix indicated in the RI-PREFIX sub-TLV 540, while the Value field 595 of the RI-PREFIX-NH sub-TLV 580 contains a next-hop address for that prefix.

Upon receiving the RI-ENTRY TLV 500, the head-end node extracts the retrieved routing information and uses that information to calculate routes reachable from the target node for insertion into its routing table 600. To that end, the head-end node maintains a "shadow table" that contains the routing information obtained from the RI-ENTRY TLV 500 returned by each target node. When calculating routes, i.e., address prefixes and associated attributes, the head-end node merges the contents of the shadow table with the routes stored in the routing table to thereby reflect the address prefixes and associated attributes reachable by the target node. Notably, the attributes associated with these calculated routes include a (i) next-hop interface (e.g., the TE-LSP), (ii) a next-hop (loop-back) address of the target node, and (iii) a cost metric for the computed routes.

Figure 6:
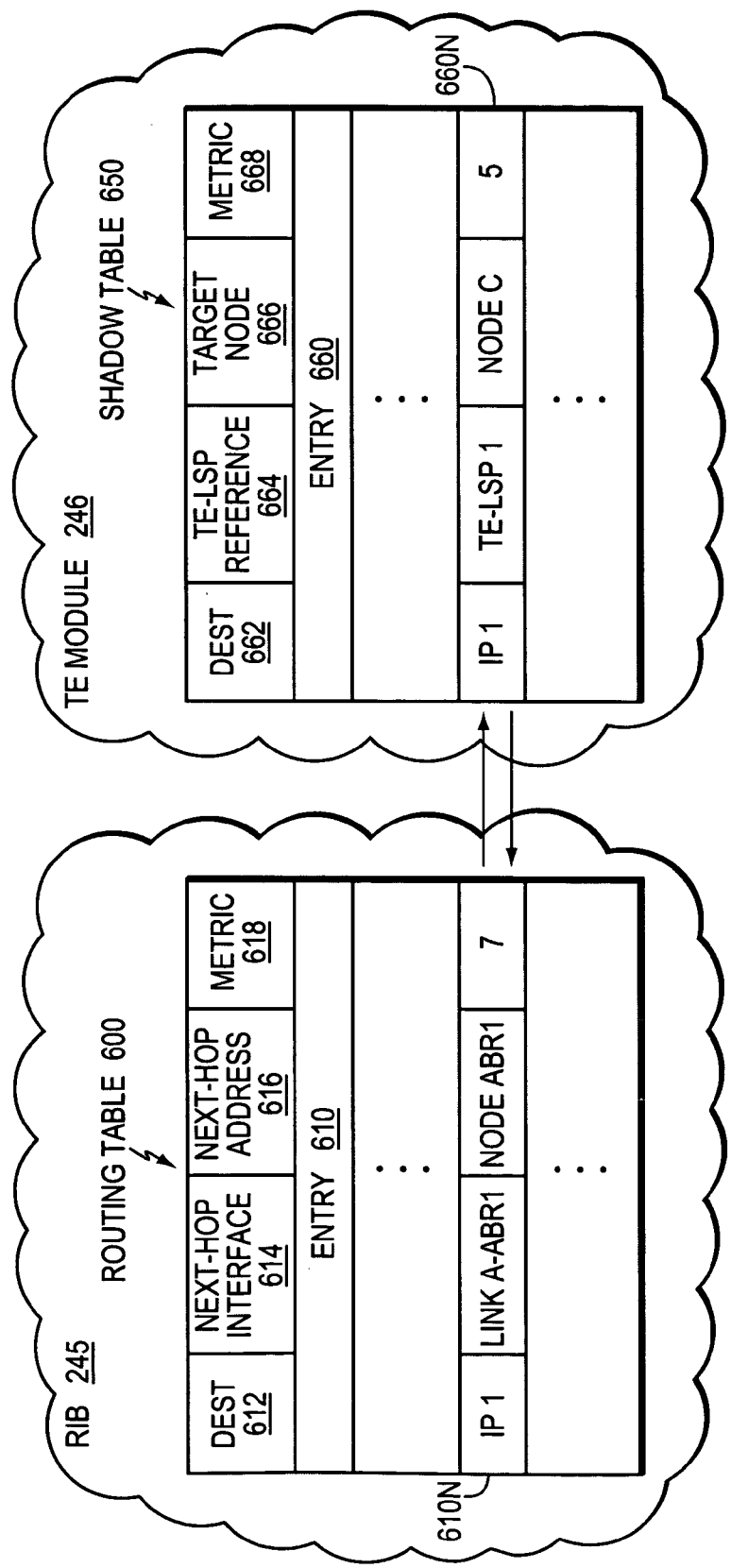
FIG. 6 is schematic block diagram of an exemplary routing table that may be advantageously used with the present invention.

FIG. 6 is schematic block diagram of exemplary routing table 600 that may be advantageously used with the present invention. Routing table 600 is illustratively stored in memory 240 and includes one or more entries 610, each comprising a plurality of fields for storing a reachable destination address 612, a next-hop interface 614 and next-hop address 616 to reach that destination, and an associated metric (e.g., cost) 618 of reaching the destination. The routing table 600 is illustratively maintained and managed by RIB 245. To that end, the RIB 245 maintains copies of routes (paths) provided by the routing protocols, such as IGP, in order to compute best paths/routes for installation into the routing table 600.

For example, assume that a destination address prefix IP1 is reachable from node A via node C. In addition, the cost of the path A-C connecting node A to node C is "6" (such as via ABR1 and ABR3 of FIG. 1), and the cost of the link C-N to the reachable address IP1 is "1." A destination address field 612 of entry 610N contains the reachable address IP1, and the next-hop fields 614, 616, are populated with, e.g., link A-ABR1 and a loopback address of node ABR1, respectively. Note that a loopback address of the next hop node is used as the next-hop address for many reasons, including as a way to avoid depending upon the availability of network interfaces of that node. The cost of IP1 is the cost of all links to the reachable address, i.e., "7."

Associated with IP1 of entry 610N is a shadow table 650. The shadow table 650 is illustratively created and maintained by the TE module 246, using the reachability information obtained from at least the novel TLV/sub-TLVs described herein, and essentially comprises the same format as routing table 600, but with destination address prefixes reachable via the target node of the TE-LSP. Specifically, each entry 660 of the shadow table 650 includes a plurality of fields for storing a destination prefix 662 reachable from the target node, a reference to the TE-LSP 664 of the target node, the address of the target node 666, and a cost metric 668 from the head-end node to the reachable prefix. Illustratively, cost metric 668 is the cost of a TE-LSP between node A and C, e.g., "4," plus the cost to reach IP1 from node C, ("1"), or "5". Notably, the cost metric for the TE-LSP may be greater than, less than, or equal to the IP cost metric of the links, and that the values "5" and "7" respectively should be taken as examples.

According to the invention, the TE module 246 cooperates with the RIB 245 to merge the contents of a shadow table entry 660N with a respective routing table entry 610N for a set of reachable destination addresses. As a result, the associated attributes of the routing table entry 610N are updated to reflect attributes reachable by the target node. For example, the entry 610N of the routing table 600 is updated such that the next-hop interface field 614 contains the TE-LSP reference from entry 664, the next-hop address field 616 contains node C from field 666, and the metric field 618 contains the cost to reach the prefix via the TE-LSP (e.g., the value "5") from field 668. Alternatively, the metric field 668 of the shadow table may be a cost metric from the target node to the reachable prefix (e.g., "1"). Also, the metric 668 may instead contain a metric value of the TE-LSP (e.g., "4"), such as when reachability costs from the tail-end node to the reachable prefix is unavailable.

The updated routing table 600 thus contains prefixes reachable from the TE-LSP, such that traffic may be routed to those prefixes along the TE-LSP. Notably, the head-end node dynamically calculates these routes, such as when updated routing information is received, as described above. Also, in one aspect of the present invention, the updated routing information triggers a partial route calculation (PRC) (such as in the case of ISIS) and not a full SPF.

In the event the TE-LSP becomes unavailable (e.g., manually removed or a TE-LSP failure), the merged prefixes and associated attributes from the shadow table 650 are removed from the routing table 600. In one aspect of the present invention, the prefixes are removed after the TE-LSP has not been restored before the expiration of a predetermined timer. Also, in another aspect of the present invention, a wait-to-restore (WTR) timer may be advantageously used before re-associating prefixes to a restored TE-LSP, in order to avoid multiple traffic disruptions in case of resource flapping.

Figure 7:
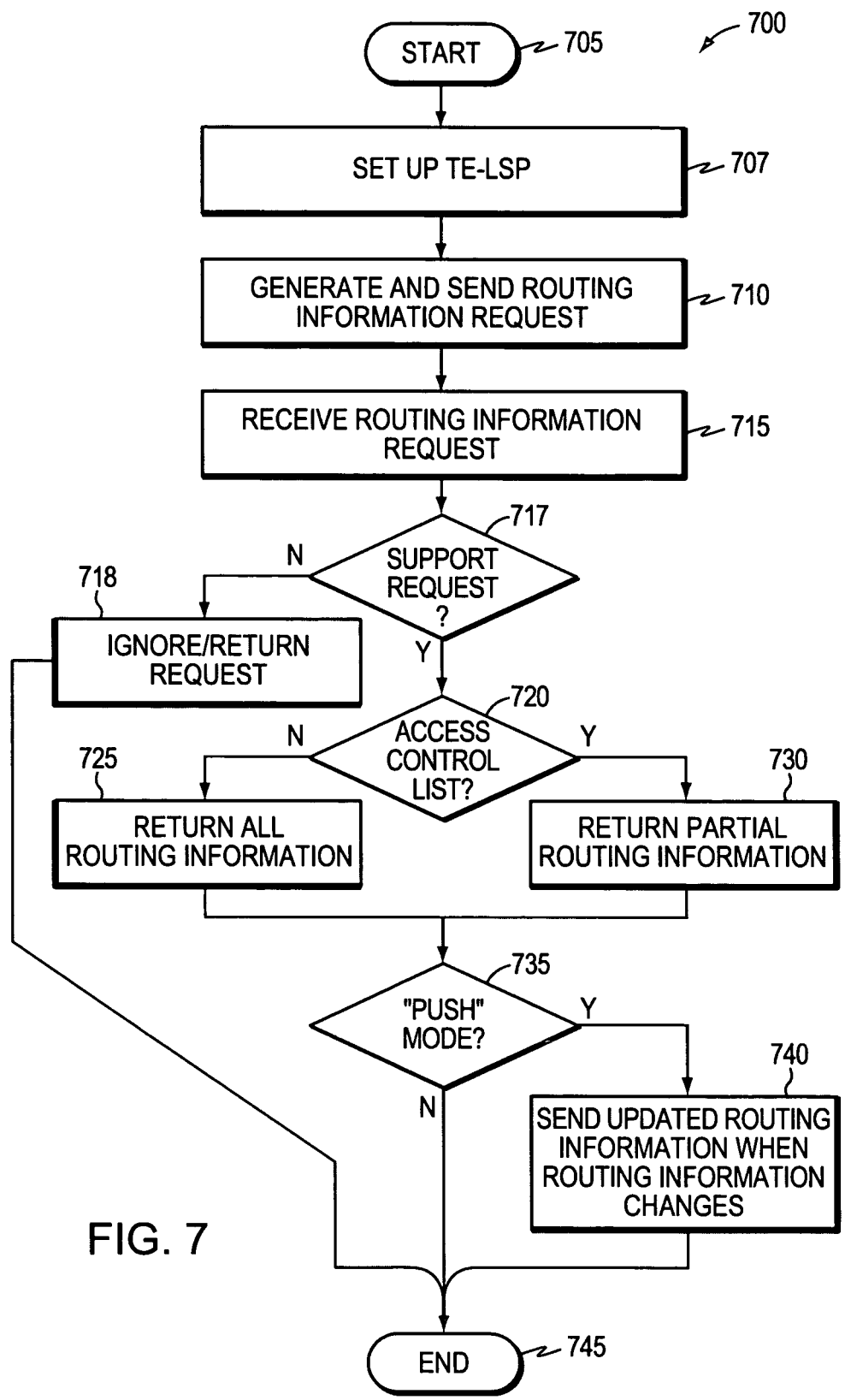
FIG. 7 is a flowchart illustrating a sequence of steps for dynamically retrieving inter-domain reachability information from a target node in accordance with the present invention.

FIG. 7 is a flowchart illustrating a sequence of steps for dynamically retrieving inter-domain reachability information from a target node in accordance with the present invention. The sequence 700 starts at step 705, and continues to step 707, where a TE-LSP is created using, e.g., explicit path (user configurable), loose-hop routing, or PCE techniques. In step 710, a head-end node (A) generates and sends a routing information request to a target node (C) on a TE-LSP. The routing information request is embodied as an RSVP Path message 300 containing the RI-REQ TLV 400 with an asserted RI-Supported flag 424. The novel RI-Supported flag 424 specifies to the head-end node whether the RI-REQ TLV is supported. At step 715, the target node specified in target sub-object 425 of the RI-REQ TLV receives and processes the request. If at step 717 the receiving target node does not support the routing information request, the target node either ignores the request, or may return the request with a de-asserted RI-Supported flag 424 in step 718 to signify to the head-end node that the request will not be processed. If supported, however, in step 720, the target node determines if the request contains an ACL 470 as described above. If no ACL is found, the target node returns all routing information in step 725 via a RI-ENTRY TLV 500 contained within an RSVP Resv message 305. In the event that an ACL is contained within the request, the target node returns only that partial routing information specified by the ACL in step 730. In step 735, the target node determines whether the head-end requested unsolicited updates ("push" mode) by examining the state of the push/pull flag 423 in the RI-REQ TLV 400 as described above. If so, the target node sends updated routing information messages whenever the routing information changes in step 740. Otherwise, if the head-end node did not request unsolicited updates from the target ("pull" mode), the target node simply waits for another route information request, and the sequence then ends in step 745.

Advantageously, the novel technique dynamically retrieves inter-domain reachability information from any node along an established TE-LSP at a head-end node of the TE-LSP. By dynamically informing the head-end node of the reachability information of nodes along the TE-LSP that spans multiple domains, the inventive technique provides an alternative to sub-optimal routing techniques, such as cumbersome manual configuration (e.g., static routing or policy routing), that can avoid some of the risks and possible errors created in such sub-optimal routing techniques.

While there has been shown and described an illustrative embodiment that retrieves inter-domain reachability information from any node along an established TE-LSP at a head-end node of the TE-LSP, it is to be understood that various other adaptations and modifications may be made within the spirit and scope of the present invention. For example, the invention may also be advantageously used with ASes under applicable circumstances (e.g., where BGP and the RSVP techniques herein do not conflict). Alternatively, through modifications to the teachings described herein and/or additional processing, those skilled in the art will understand that the present invention may be adapted for use with ASes generally.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for dynamically retrieving inter-domain reachability information from a target node located internal to a remote domain along a traffic engineering (TE) label switched path (LSP) that spans multiple domains in a computer network, the method comprising:
   requesting the inter-domain reachability information from the target node of the TE-LSP that spans multiple domains, over a network interface of a head-end node of the TE-LSP that spans multiple domains, wherein the head-end node is located internal to a local domain and the target node is located internal to the remote domain, and wherein the inter-domain reachability information includes at least one address prefix reachable from the target node utilizing the TE-LSP that spans multiple domains;
   returning the requested inter-domain reachability information from the target node to the head-end node;
   calculating, at the head-end node, a shadow table of the head-end node that includes one or more routes reachable utilizing the TE-LSP to the target node, based on the requested inter-domain reachability information; and
   merging, at the head-end node, the one or more routes included in the shadow table that are reachable utilizing the TE-LSP to the target node, with non-TE-LSP routes in a routing table that are reachable not utilizing the TE-LSP by inserting the one or more of the routes included in the shadow table into the routing table of the head-end node.

2. The method of claim 1, further comprising: requesting the reachability information via a request/response signaling exchange.

3. The method of claim 2, further comprising: issuing a routing information request (RI-REQ) data structure from the head-end node to the target node during a request stage of the signaling exchange.

4. The method of claim 2, further comprising: returning a routing information entry (RI-ENTRY) data structure from the target node to the head-end node during a response stage of the signaling exchange.

5. The method of claim 2, wherein the request/response signaling exchange is embodied as extensions to Resource ReSerVation Protocol (RSVP) TE signaling messages.

6. The method of claim 4, further comprising: returning a routing information prefix (RI-PREFIX) data structure within the RI-ENTRY data structure, wherein the RI-PREFIX data structure contains an address prefix reachable by the target node.

7. The method of claim 6, further comprising: returning routing information prefix cost (RI-PREFIX-COST) and routing information prefix next hop (RI-PREFIX-NH) data structures within the RI-ENTRY data structure, wherein the RI-PREFIX-COST data structure contains a cost metric associated with reaching the address prefix from the target node and the RI-PREFIX-NH data structure contains a next hop address for reaching the prefix.

8. The method of claim 1, wherein the TE-LSP spans multiple areas.

9. A system for dynamically retrieving reachability information from a target node located internal to a remote domain along a traffic engineering (TE) label switched path (LSP) that spans multiple domains in a computer network, the system comprising:
   a head-end node of the TE-LSP configured to request the inter-domain reachability information from the target node of the TE-LSP that spans multiple domains, over a network interface of the head-end node of the TE-LSP that spans multiple domains, wherein the head-end node is located internal to a local domain and the target node is located internal to the remote domain, and wherein the inter-domain reachability information includes at least one address prefix reachable from the target node utilizing the TE-LSP that spans multiple domains;
   the target node configured to return the requested inter-domain reachability information to the head-end node;
   a processor in the head-end node configured to execute a routing information base of the head-end node and configured to calculate a shadow table of the head-end node that includes one or more routes reachable utilizing the TE-LSP to the target node based on the requested inter-domain reachability information, and to merge the one or more routes included in the shadow table that are reachable utilizing the TE-LSP to the target node with non-TE-LSP routes in a routing table that are reachable not utilizing the TE-LSP by inserting the one or more routes included in the shadow table into the routing table; and
   a memory in the head-end node configured to store the shadow table and the routing table of the head-end node.

10. The system of claim 9, further comprising: a routing information request (RI-REQ) data structure issued from the head-end node to the target node to request the reachability information.

11. The system of claim 9, further comprising: a routing information entry (RI-ENTRY) data structure returned from the target node to the head-end node to return the reachability information.

12. The system of claim 11, further comprising: a routing information prefix (RI-PREFIX) data structure returned within the RI-ENTRY data structure, wherein the RI-PREFIX data structure contains an address prefix reachable by the target node.

13. The system of claim 12, further comprising:
a routing information prefix cost (RI-PREFIX-COST) data structure returned within the RI-ENTRY data structure, wherein the RI-PREFIX-COST data structure contains a cost metric associated with reaching the address prefix from the target node; and
a routing information prefix next-hop (RI-PREFIX-NH) data structure returned within the RI-ENTRY data structure, wherein the RI-PREFIX-NH data structure contains a next-hop address for reaching the prefix.

14. A non-transitory computer readable medium containing executable program instructions for dynamically retrieving reachability information from a target node located internal to a remote domain along a traffic engineering (TE) label switched path (LSP) that spans multiple domains in a computer network, the executable program instructions comprising program instructions for:
requesting the inter-domain reachability information from the target node of the TE-LSP that spans multiple domains, at a head-end node of the TE-LSP that spans multiple domains, wherein the head-end node is located internal to a local domain and the target node is located internal to the remote domain, and wherein the inter-domain reachability information includes at least one address prefix reachable from the target node utilizing the TE-LSP that spans multiple domains;
receiving the requested inter-domain reachability information from the target node at the head-end node;
calculating, at the head-end node, a shadow table of the head-end node that includes one or more routes reachable utilizing the TE-LSP to the target node, based on the requested inter-domain reachability information;
merging, at the head-end node, the one or more routes included in the shadow table that are reachable utilizing the TE-LSP to the target node, with non-TE-LSP routes in a routing table that are reachable not utilizing the TE-LSP by inserting the one or more routes included in the shadow table into the routing table of the head-end node.

15. The computer readable medium of claim 14 further containing a routing information request (RI-REQ) data structure for dynamically retrieving the reachability information to the head-end node from the target node along the TE-LSP, the data structure comprising:
one or more flags, one of the one or more flags indicating that routing information is requested;
one or more target objects indicating one or more target nodes to which the request is directed; and
an access control list (ACL) to indicate which one or more prefixes the request is directed.

16. The computer readable medium of claim 14 further containing a routing information entry (RI-ENTRY) data structure for dynamically returning the reachability information from the target node along the TE-LSP, the data structure comprising:
a target object indicating from which target node is the return originated; and
one or more sets of one or more objects selected from the group consisting of,
(i) a routing information prefix (RI-PREFIX) data structure containing an address prefix reachable by the target node,
(ii) a routing information prefix cost (RI-PREFIX-COST) data structure containing a cost metric associated with reaching the address prefix from the target node; and
(iii) a routing information prefix next-hop (RI-PREFIX-NH) data structure containing a next-hop address for reaching the prefix.

17. A system comprising:
a head-end node of a traffic engineering (TE) label switched path (LSP) that spans multiple domains in a computer network, the head-end node located within a local domain and including,
a network interface that couples the head-end node to one or more inter-domain nodes of the local domain through which the head-end node communicates with other domains, wherein the network interface contains circuitry for communicating data over the computer network,
a processor that executes software processes,
a services module configured to generate a signaling message that requests inter-domain reachability information from a target node located along the TE-LSP that spans multiple domains and internal to a remote domain, and to send the signaling message through the network interface, the services module further configured to process received inter-domain reachability information from the target node wherein the inter-domain reachability information includes at least one address prefix reachable from the target node utilizing the TE-LSP that spans multiple domains,
a routing information base configured to calculate a shadow table of the head-end node that includes one or more routes reachable utilizing the TE-LSP to the target node based on the received inter-domain reachability information, and to merge the one or more routes included in the shadow table that are reachable utilizing the TE-LSP to the target node with non-TE-LSP routes in a routing table that are not reachable utilizing the TE-LSP by inserting the routes included in the shadow table into the routing table.

18. The system of claim 17, wherein the signaling message includes a routing information request (RI-REQ) data structure to request the reachability information.

19. The system of claim 17, wherein the received reachability information includes a routing information entry (RI-ENTRY) data structure returned from the target node.

20. The system of claim 19, wherein the RI-ENTRY data structure includes a routing information prefix (RI-PREFIX) data structure that contains an address prefix reachable by the target node.

21. The system of claim 17, further comprising:
an inter-domain node in the remote domain coupled to the target node, the inter-domain node located along the TE-LSP.

* * * * *